(12) United States Patent
Orth et al.

(10) Patent No.: US 7,700,035 B2
(45) Date of Patent: Apr. 20, 2010

(54) DIRECT SMELTING PLANT AND PROCESS

(75) Inventors: Andreas Orth, Friedrichsdorf (DE); David John Leigh, Kensington (AU); Peter Damian Burke, Winthrop (AU)

(73) Assignee: Outotec Oyj, Espoo (FI)

( * ) Notice: Subject to any disclaimer, the term of this patent is extended or adjusted under 35 U.S.C. 154(b) by 612 days.

(21) Appl. No.: 10/576,852

(22) PCT Filed: Oct. 16, 2004

(86) PCT No.: PCT/EP2004/011700

§ 371 (c)(1),
(2), (4) Date: Feb. 13, 2007

(87) PCT Pub. No.: WO2005/040433

PCT Pub. Date: May 6, 2005

(65) Prior Publication Data

US 2007/0272058 A1 Nov. 29, 2007

(30) Foreign Application Priority Data

Oct. 21, 2003 (AU) ............................. 2003905777

(51) Int. Cl.
C21B 9/10 (2006.01)
C21B 7/16 (2006.01)
(52) U.S. Cl. .................. 266/135; 266/136; 266/269
(58) Field of Classification Search .............. 266/135, 266/136, 269
See application file for complete search history.

(56) References Cited

U.S. PATENT DOCUMENTS

| | | | |
|---|---|---|---|
| 3,371,186 A | 2/1968 | Trabilcy | |
| 3,573,337 A | 4/1971 | Grimm et al. | |
| 4,758,118 A | 7/1988 | Rachner et al. | ............ 406/24 |
| 5,201,940 A * | 4/1993 | Batterham et al. | ........... 75/414 |
| 6,835,229 B2 * | 12/2004 | Brown et al. | ............. 75/460 |
| 2003/0071399 A1 * | 4/2003 | Leigh | ................ 266/267 |
| 2004/0256773 A1 | 12/2004 | Dry et al. | ................ 266/195 |
| 2007/0272318 A1 | 6/2007 | Hoffhaus et al. | |

FOREIGN PATENT DOCUMENTS

| | | |
|---|---|---|
| EP | 64857 A2 * | 11/1982 |
| EP | 0 190 592 | 8/1986 |
| EP | 0 629 708 | 12/1994 |
| EP | 1 211 202 | 6/2002 |
| WO | WO-0202827 | 1/2002 |

OTHER PUBLICATIONS

PCT International Search Report for PCT/EP2004/011700 mailed Sep. 13, 2005.

* cited by examiner

*Primary Examiner*—George Wyszomierski
*Assistant Examiner*—Tima M McGuthry-Banks
(74) *Attorney, Agent, or Firm*—Darby & Darby

(57) ABSTRACT

A direct smelting plant for producing molten metal from metalliferous feed material includes a pretreatment unit for pretreating metalliferous feed material and producing pretreated feed material, a direct smelting vessel for smelting pretreated metalliferous feed material to molten metal and a hot feed material transfer apparatus for transferring pretreated metalliferous feed material from the pretreatment unit to a solids delivery device of the direct smelting vessel. The transfer apparatus includes a hot feed material storage device, a hot feed material transfer line, device for unblocking the hot feed material transfer line and a pressurising device. The hot feed material transfer apparatus includes a device for returning pretreated metalliferous feed material to the pretreatment unit.

12 Claims, 4 Drawing Sheets

DIRECT SMELTING PLANT AND PROCESS

This application is the national phase application under 35 U.S.C. §371 of International Application No. PCT/EP2004/011700 filed on Oct. 16, 2004, entitled, "DIRECT SMELTING PLANT AND PROCESS" which claims the benefit of Australian Patent Application No. 2003905777 filed on Oct. 21, 2003.

TECHNICAL FIELD

The present invention relates to a direct smelting plant and a direct smelting process for producing molten metal from a metalliferous feed material, such as ores, partly reduced ores, and metal-containing waste streams.

The term "smelting" is herein understood to mean thermal processing wherein chemical reactions that reduce metalliferous feed material take place to produce molten metal.

In general terms the present invention relates to a direct smelting plant that includes a direct smelting vessel for smelting metalliferous feed material to metal, a pretreatment unit for pretreating metalliferous feed material and producing pretreated metalliferous feed material having a temperature of at least 200° C. for smelting in the vessel, and a metalliferous feed material transfer apparatus for storing pretreated metalliferous feed material having a temperature of at least 200° C. and transferring hot pretreated metalliferous feed material, i.e. feed material at a temperature of at least 200° C. under pressure to solids delivery means of the direct smelting vessel.

In general terms the present invention also relates to a direct smelting process for producing molten metal from a metalliferous feed material in such a direct smelting plant.

The present invention relates particularly, although by no means exclusively, to metalliferous feed material in the form of iron-containing feed material, such as iron ore fines.

A known direct smelting process for producing molten metal, which relies principally on a molten bath as a reaction medium, and is generally referred to as the HIsmelt process, is described in International Application PCT/AU96/00197 (WO 96/31627) and other patent applications, such as the more recently filed Australian provisional application 2003901693 (which focuses on producing molten iron from iron ore fines), in the name of Technological Resources Pty. Limited.

The HIsmelt process includes the steps of:
(a) forming a bath of molten metal and slag in a direct smelting vessel;
(b) injecting into the bath:
  (i) a metalliferous feed material, typically metal oxides; and
  (ii) a solid carbonaceous material, typically coal, which acts as a reductant of the metalliferous feed material and a source of energy; and
(c) smelting metalliferous feed material to metal in the bath.

In the HIsmelt process the metalliferous feed material and solid carbonaceous material are injected into the molten bath through solids delivery means in the form of lances which are inclined to the vertical so as to extend downwardly and inwardly through the side wall of the direct smelting vessel and into a lower region of the vessel so as to deliver at least part of the solids material into the metal layer in the bottom of the vessel.

The HIsmelt process enables large quantities of molten metal to be produced by direct smelting in a single compact vessel.

The HIsmelt process is particularly applicable for smelting iron-containing feed material in the form of iron ore fines.

One possible type of plant configuration for operating the HIsmelt process, and other molten bath-based direct smelting processes, includes a pretreatment unit for pretreating metalliferous feed material prior to supplying the material to a direct smelting vessel. The pretreatment may be confined to preheating metalliferous feed material. The pretreatment may include at least partially reducing feed material in a solid state. By way of further example, the pretreatment may include roasting feed material.

The present invention provides an effective and reliable plant that can pretreat metalliferous feed material and produce a pretreated feed material at a temperature of at least 200° C. and transfer hot pretreated metalliferous feed material to solids delivery means of a direct smelting vessel during a direct smelting campaign.

DISCLOSURE OF THE INVENTION

In general terms, the present invention provides a direct smelting plant for producing molten metal, such as molten iron, from metalliferous feed material, such as iron ore fines, that includes:
(a) a pretreatment unit for pretreating metalliferous feed material and producing pretreated feed material having a temperature of at least 200° C.;
(b) a direct smelting vessel for smelting pretreated metalliferous feed material to molten metal, the vessel being adapted to contain a molten bath of metal and slag, the vessel including a solids delivery means for receiving and thereafter supplying pretreated metalliferous feed material at a pressure above atmospheric pressure and at a temperature of at least 200° C. into the vessel;
(c) a hot feed material transfer apparatus for transferring pretreated metalliferous feed material from the pretreatment unit to the solids delivery means of the direct smelting vessel, the transfer apparatus comprising:
  (i) a hot feed material storage means for storing pretreated metalliferous feed material at at least 200° C. and at a pressure above atmospheric pressure;
  (ii) a hot feed material transfer line for transferring pretreated metalliferous feed material at at least 200° C. under pressure to the solids delivery means of the direct smelting vessel;
  (iii) a pressurising means for supplying gas at a pressure above atmospheric pressure to the hot feed material storage means for pressurising the storage means and to the hot feed material transfer line for pressurising the transfer line and acting as a carrier gas for transporting pretreated metalliferous feed material along the transfer line to the solids delivery means.

Preferably the pretreatment unit is selected from a group that includes a preheater, a prereducer, and a roaster. In use, the prereducer and the roaster heat metalliferous feed material as part of standard operation to carry out their primary functions of prereducing and roasting metalliferous feed material.

Preferably the plant further comprises a hot feed material transfer means for transferring pretreated metalliferous feed material from the pretreatment unit to the hot feed material transfer apparatus.

Preferably the hot feed material transfer means comprises a pan conveyor.

Preferably the metalliferous feed material is an iron-containing feed material and the molten bath contains molten iron. The iron-containing feed material may comprise iron with any reduction grade between 0 and 100%, preferably iron with an reduction grade between 8 and 95%, and may contain further components, such as carbon or the like.

Preferably the iron-containing feed material is in the form of iron ore fines.

Generally the top size of the iron ore fines lies within in the range between 6 and 8 mm. Preferably at least 30% of the iron ore fines have a particle size of less than 0.5 mm, while the $d\_50$ diameter lies between 0.8 and 1.0 mm with a wide particle size distribution. Thus, e.g. 95% of the particles provide a particle size of less than 6.3 mm.

Preferably the pressure in the hot feed material storage means is at least 3 bar absolute, more preferably at least 4 bar absolute.

Preferably the pressure in the hot feed material transfer line in the region of a location at which the pretreated metalliferous feed material is introduced into the transfer line from the hot feed material storage means is at least 3 bar absolute, more preferably at least 4 bar absolute.

Preferably the solids delivery means is a solids injection means for injecting pretreated metalliferous feed material under pressure into the direct smelting vessel.

Preferably the solids delivery means is a solids injection means for injecting pretreated metalliferous feed material into the molten bath.

Preferably the solids injection means is a lance.

Preferably the hot feed material transfer apparatus includes a means for controlling the flow of pretreated metalliferous feed material from the hot feed material storage means into the hot feed material transfer line.

Preferably the storage flow control means is a means for supplying a predetermined mass flow rate of pretreated metalliferous feed material to the hot feed material transfer line.

Preferably the storage flow control means is a screw conveyor having a pretreated metalliferous feed material inlet, a gas inlet, and an outlet for pretreated metalliferous feed material connected to the hot feed material transfer line.

Preferably the hot feed material storage means includes (a) an upper lock hopper having a pretreated metalliferous feed material inlet, a gas inlet for pressurising the lock hopper, and a pretreated metalliferous feed material outlet, (b) a lower lock hopper having a pretreated metalliferous feed material inlet, a gas inlet for pressurising the lock hopper, and a pretreated metalliferous feed material outlet, and (c) a line interconnecting the outlet of the upper lock hopper and the inlet of the lower lock hopper.

Preferably the hot feed material storage means further includes a line interconnecting the outlet of the lower lock hopper and the feed material inlet of the screw conveyor.

Preferably the hot feed material transfer apparatus also includes a means for controlling the flow of pretreated metalliferous feed material along the hot feed material transfer line from the hot feed material storage means to the solids delivery means.

Preferably the transfer line flow control means is operable to control the flow of pretreated metalliferous feed material along the hot feed material transfer line to be at a velocity that maintains the pretreated metalliferous feed material in suspension in the carrier gas in the transfer line.

Preferably the transfer line flow control means controls the flow of the carrier gas into the hot feed material transfer line in order to control the flow of pre-treated metalliferous feed material along the hot feed material transfer line.

When the metalliferous feed material is iron ore fines that have a top size in the range of 6-8 mm and are pretreated and thereby attain a temperature of up to 680° C. and the carrier gas is at least substantially $N_2$ and fed to the transfer line at an ambient temperature, preferably the velocity of the carrier gas conveying the pretreated metalliferous feed material in the transfer line is at least 19 m/s.

Preferably the flow control means is operable to control the flow of pretreated metalliferous feed material along the hot feed material transfer line to deliver pretreated metalliferous feed material to the solids delivery means so that the solids delivery means can transfer the carrier gas and pretreated metalliferous feed material into the direct smelting vessel at a predetermined velocity.

Preferably the predetermined velocity of the carrier gas is in the range of 70-120 m/s.

More preferably the predetermined velocity of the carrier gas is 112 m/s.

Preferably there is a pressure drop of approximately 1 bar across the solids delivery means.

Preferably the carrier gas at least substantially comprises an inert gas.

Preferably the inert gas is $N_2$.

Preferably the hot feed material transfer apparatus includes a means for returning pretreated metalliferous feed material to the pretreatment unit.

Preferably the means for returning the hot metalliferous feed material to the pretreatment unit is adapted to operate while the direct smelting vessel is operating on stand-by and does not require pretreated metalliferous feed material.

Preferably the means for returning hot metalliferous feed material to the pretreatment unit includes (a) a return transfer line interconnecting the hot feed material transfer line and the pretreatment unit and (b) valves in the lines that are selectively operable to allow pretreated metalliferous feed material flowing along the hot feed material transfer line to be returned to the pretreatment unit via the return transfer line.

Preferably the hot feed material transfer apparatus includes a means for unblocking the hot feed material transfer line without the need for manual intervention on the line or shutting down operation of the direct smelting vessel.

Preferably the means for unblocking the hot feed material transfer line includes a plurality of means for selectively pressurising the hot feed material transfer line at a series of locations along the length of the line so that the line can be selectively pressurised and depressurised upstream and/or downstream of a blockage in the line.

Preferably the means for unblocking the hot feed material transfer line includes a plurality of discharge lines for discharging dislodged material from a blockage in the hot feed material transfer line at a series of locations along the length of the line.

Preferably the return transfer line is one such discharge line.

Preferably the means for unblocking the hot feed material transfer line includes a plurality of detectors for detecting the location of a blockage in the hot feed material transfer line.

Preferably the direct smelting vessel is a fixed smelting vessel for holding a molten bath of metal and slag and a gas space above the bath and the solids delivery means include 2 or more pairs of solids injection lances arranged around and extending into the vessel, with the lances of each pair of lances being diametrically opposed to each other, with at least one pair of lances being provided for injecting pretreated metalliferous feed material and at least one of the other pairs of lances being provided for injecting solid carbonaceous material, and with the pairs of lances being arranged around the vessel so that adjacent lances are lances that are provided to inject different materials.

Preferably the direct smelting vessel includes a gas injection means extending downwardly into the vessel to inject an oxygen-containing gas into the gas space and/or the bath in the vessel.

Preferably the direct smelting vessel includes a gas delivery duct means extending from a gas supply location away from the vessel to a delivery location above the vessel for delivering the oxygen-containing gas into the gas injection means.

Preferably the direct smelting vessel includes an offgas duct means for facilitating flow of offgas from the vessel away from the vessel.

Preferably the direct smelting vessel includes a metal tapping means for tapping molten metal from the bath and transporting that molten metal away from the vessel.

Preferably the direct smelting vessel includes a slag tapping means for tapping slag from the bath and transporting that slag away from the vessel.

Preferably the solids injection lances are arranged to extend downwardly and inwardly into the vessel through openings in a side wall of the vessel.

Preferably the lance openings in the side wall of the vessel are located at the same height of the vessel and are spaced at equal distances around the circumference of the vessel.

According to the present invention there is also provided a direct smelting process for producing molten metal from metalliferous feed material, such as iron ore fines, that includes the steps of:
(a) pretreating metalliferous feed material in a pretreatment unit and producing pretreated feed material having a temperature of at least 200° C.;
(b) storing pretreated metalliferous feed material having a temperature of at least 200° C. under pressure in a hot feed material storage means;
(c) transferring pretreated metalliferous feed material having a temperature of at least 200° C. under pressure in a hot feed material transfer line to a solids delivery means of a direct smelting vessel;
(d) delivering pretreated metalliferous feed material into the direct smelting vessel and smelting metalliferous feed material to molten metal in the vessel.

Preferably the process includes returning pretreated metalliferous feed material to the pretreatment unit while the direct smelting vessel is operating on stand-by and does not require pretreated metalliferous feed material.

Preferably, in response to a blockage occurring in the hot feed material transfer line, the process includes unblocking the hot feed material transfer line without the need for manual intervention on the line or shutting down operation of the direct smelting vessel by selectively depressurising the hot feed material transfer line upstream and/or downstream of a blockage in the line.

Preferably the process includes unblocking the hot feed material transfer line by selectively pressurising the hot feed material transfer line upstream or downstream of a blockage in the line and thereafter depressurising the line on the other side of the line to the pressurised side.

Preferably the process includes suddenly depressurising the line.

Preferably the process includes repeating the above sequence of pressurising and depressurising the line on opposite sides of the blockage.

Especially when the metalliferous feed material is an iron-containing material, preferably step (a) includes pretreating feed material by preheating feed material to a temperature of at least 400° C. and more preferably to at least 600° C.

Preferably the temperature is at least 660° C.

More preferably the temperature is in the range of 670° C.-690° C.

Preferably step (b) includes storing pretreated metalliferous feed under pressure in the hot feed material storage means by supplying a pressurising gas to the hot feed material storage means.

Preferably the pressurising gas at least substantially comprises an inert gas.

Preferably step (c) includes transferring pretreated metalliferous feed material under pressure in the hot feed material transfer line by supplying a carrier gas to the hot feed material transfer line to transport pretreated metalliferous feed material along the line.

Preferably the carrier gas at least substantially comprises an inert gas.

Preferably the carrier gas is supplied to the hot feed material transfer line at an ambient temperature.

Preferably step (c) includes controlling the flow of pretreated metalliferous feed material along the hot feed material transfer line to be at a velocity that maintains the hot metalliferous feed material in suspension in the carrier gas in the transfer line.

Preferably step (c) includes controlling the flow of the carrier gas along the hot feed material transfer line in order to control the flow of pretreated metalliferous feed material along the hot feed material transfer line.

When the metalliferous feed material is iron ore fines that have a top size in the range of 6-8 mm and are pretreated by being preheated to a temperature of 680° C. and the carrier gas is at least substantially $N_2$ and supplied to the transfer line at an ambient temperature, preferably the velocity of the carrier gas in the transfer line is at least 19 m/s.

Preferably step (d) includes delivering pretreated metalliferous feed material into the direct smelting vessel at a pressure above atmospheric pressure.

Preferably step (d) includes delivering pretreated metalliferous feed material into the direct smelting vessel at a temperature above 200° C., more preferably above 400° C. and even more preferably above 600° C.

Preferably the solids delivery means are solids injection lances and step (d) includes delivering pretreated metalliferous feed material into the direct smelting vessel by injecting pretreated metalliferous feed material via the solids injection lances with carrier gas velocity in the range of 70-120 m/s.

BRIEF DESCRIPTION OF THE DRAWINGS

Embodiments of the present invention are described in more detail hereinafter with reference to the accompanying drawings, of which.

DETAILED DESCRIPTION OF THE PREFERRED EMBODIMENT

The following description of a preferred embodiment of a direct smelting plant and process in accordance with the present invention is in the context of smelting iron ore fines. It is noted that the present invention is not limited to iron-bearing material in this form and extends to iron-bearing materials in other forms and is not limited to iron-bearing material per se and extend to metalliferous feed materials in general.

Figure 1:
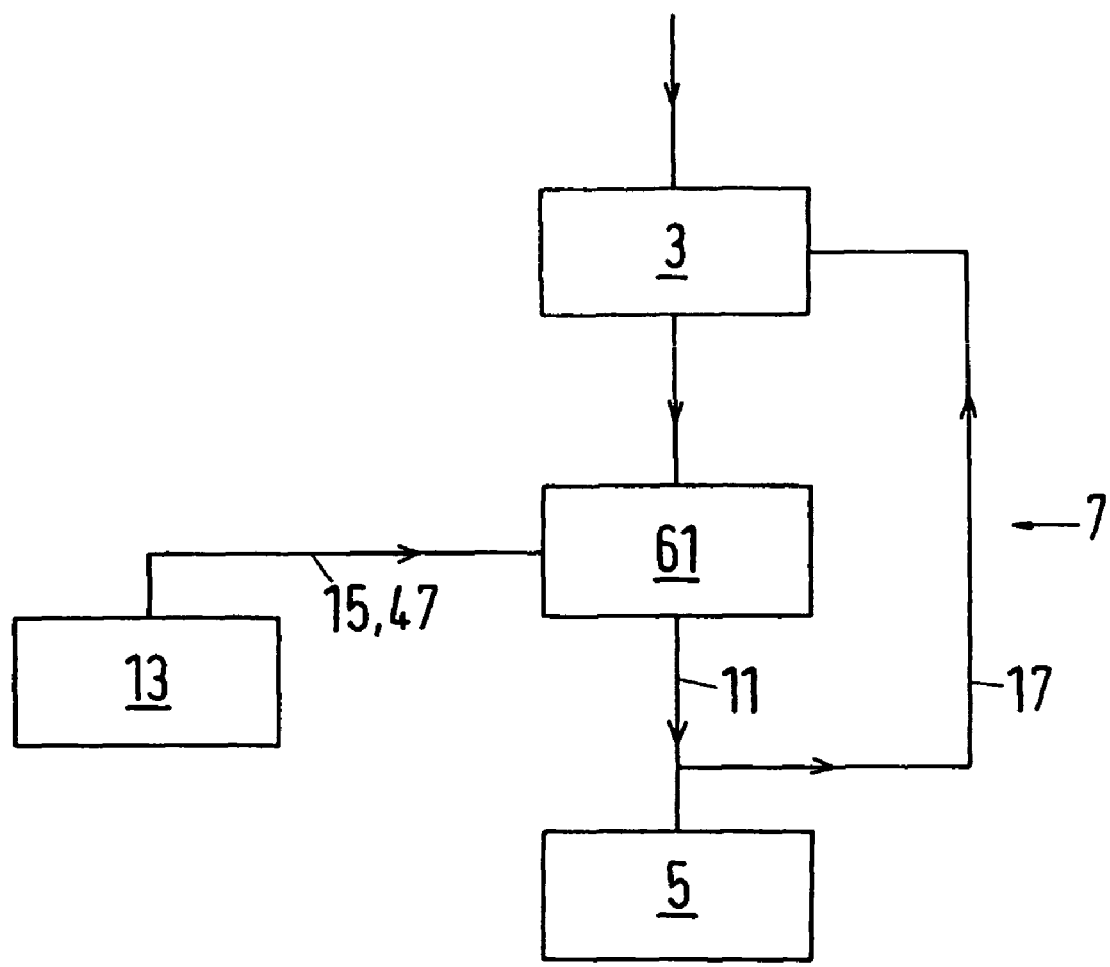
FIG. 1 is a flow sheet which illustrates in simplified terms the main components of a direct smelting plant in accordance with an embodiment of the present invention.

With reference to FIG. 1, insofar as the present embodiment is concerned, the main components of the direct smelting plant are:

(a) a pretreatment unit in the form of a preheater 3 for preheating iron-containing feed material in the form of iron ore fines;

(b) a direct smelting vessel 5 for smelting the preheated iron ore fines to molten iron; and (c) a hot iron-containing feed material transfer apparatus generally identified by the numeral 7 for storing preheated iron ore fines and transferring the fines under pressure to solids injection lances of the direct smelting vessel.

The preheater 3 may be any suitable preheater, such as a shaft furnace or a circulating fluidised bed that can preheat iron ore fines, typically to a temperature of the order of 680° C.

The direct smelting vessel 5 may be any suitable vessel for carrying out a direct smelting process, such as the HIsmelt process described above.

Australian provisional application 2003901693 in the name of the applicant includes a description of the general construction of a HIsmelt vessel and the disclosure in the Australian provisional application is incorporated herein by cross-reference.

In basic terms, the HIsmelt vessel described in Australian provisional application 2003901693 includes a hearth that includes a base and sides formed from refractory bricks, side walls which form a generally cylindrical barrel extending upwardly from the sides of the hearth and include an upper barrel section and a lower barrel section formed from water-cooled panels, a roof, an outlet for offgases, a forehearth for discharging molten metal continuously, and a tap-hole for discharging molten slag.

In use, the vessel contains a molten bath of iron and slag which includes a layer of molten metal and a layer of molten slag on the metal layer.

The vessel is fitted with a downwardly extending gas injection lance for delivering a hot air blast into an upper region of the vessel. The gas injection lance receives an oxygen-enriched hot air flow through a hot gas delivery duct which extends from a hot gas supply station located some distance away from the reduction vessel.

The vessel is also fitted with eight solids injection lances extending downwardly and inwardly through the side walls and into the slag layer of the molten bath for injecting preheated iron ore fines, solid carbonaceous material, and fluxes entrained in an oxygen-deficient carrier gas into the metal layer. The positions of the solids injection lances are selected so that their outlet ends are above the surface of the metal layer during operation of the process. These positions of the solids injection lances reduce the risk of damage through contact with molten metal and also makes it possible to cool the lances by forced internal water cooling without significant risk of water coming into contact with the molten metal in the vessel.

The solids injection lances are in 2 groups of 4 lances, with the lances in one group receiving preheated hot iron ore fines and the lances (not shown) in the other group receiving coal and flux (via a carbonaceous material/flux injection system—not shown) during a smelting operation. The lances in the 2 groups are arranged alternately around the circumference of the vessel. The lances receiving preheated hot iron ore fines are identified by the numeral 27 in FIG. 4.

The hot iron-containing feed material transfer apparatus 7 includes;

(a) a hot feed material storage means for storing preheated iron ore fines under pressure generally identified by the numeral 61;

(b) a series of hot feed material transfer lines 11 (only one of which is shown in the flowsheet of FIG. 1) for transferring preheated iron ore fines under pressure from the storage means 61 to solids injection lances;

(c) a source of $N_2$ gas 13 and $N_2$ gas lines 15 for supplying $N_2$ gas to pressurise the storage means 61 and to transport pretreated iron ore fines along the transfer lines 11; and (d) a return line 17 for returning preheated iron ore fines to the preheater 3 in situations in which the direct smelting vessel 5 is on stand by and does not require any iron ore fines—this is an important feature from a safety perspective when operating a direct smelting plant with preheated or other forms of pre-treated feed materials as it allows for containment of such materials to the pretreatment unit, the return line 17 or the transfer line 11 in the event of a blockage or idle operation of the smelting vessel 5. The return line 17 also allows for commissioning and testing of the transfer lines 11 and the storage means 61 without the need to operate or pass feed material to the smelting vessel 5.

Figure 2:
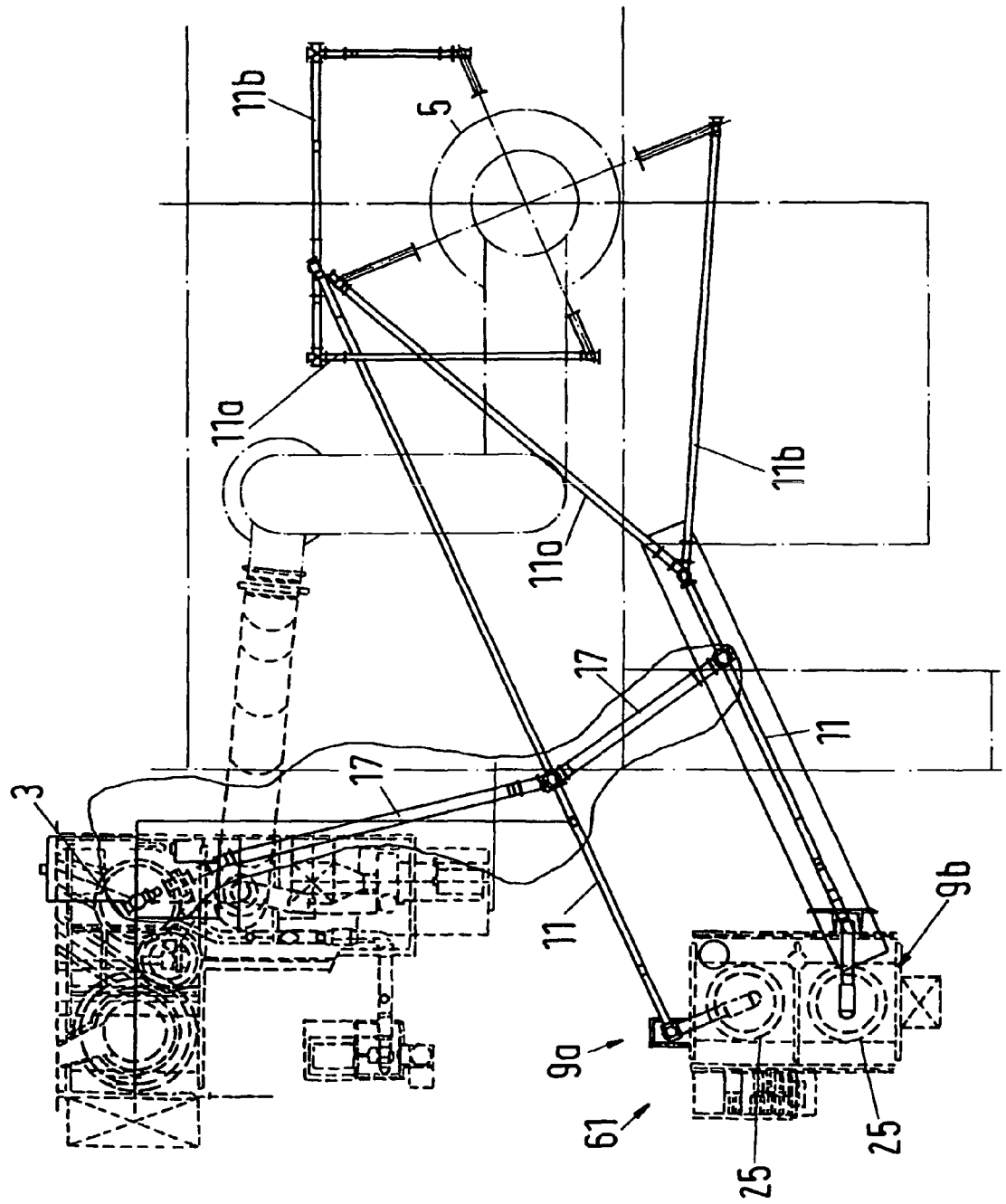
FIG. 2 illustrates the locations of the main components, namely the pretreatment unit (in the form of a preheater), direct smelting vessel, and hot iron-containing feed material transfer apparatus, in one particular embodiment of the plant shown in FIG. 1.
Figure 3:
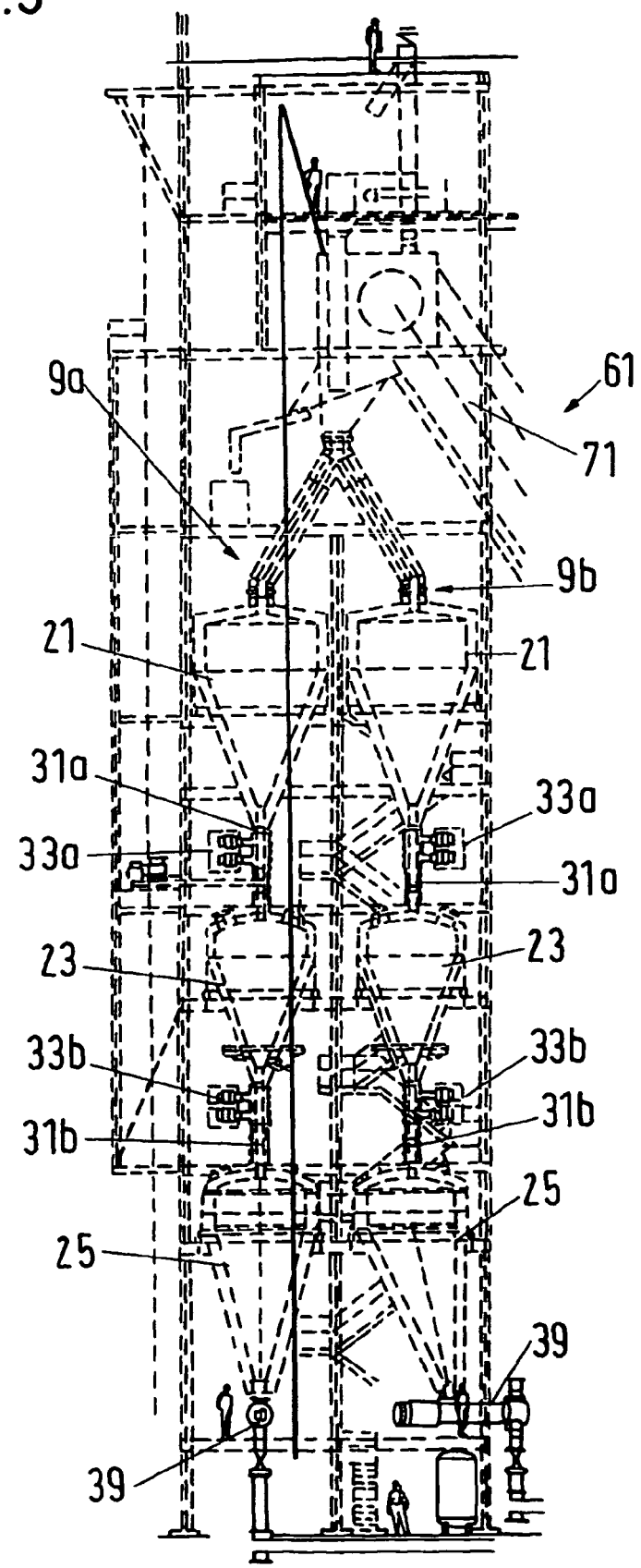
FIG. 3 is a side elevation of the lock hoppers and screw conveyors that form part of the hot iron-containing feed material transfer apparatus shown in FIG. 2.
Figure 4:
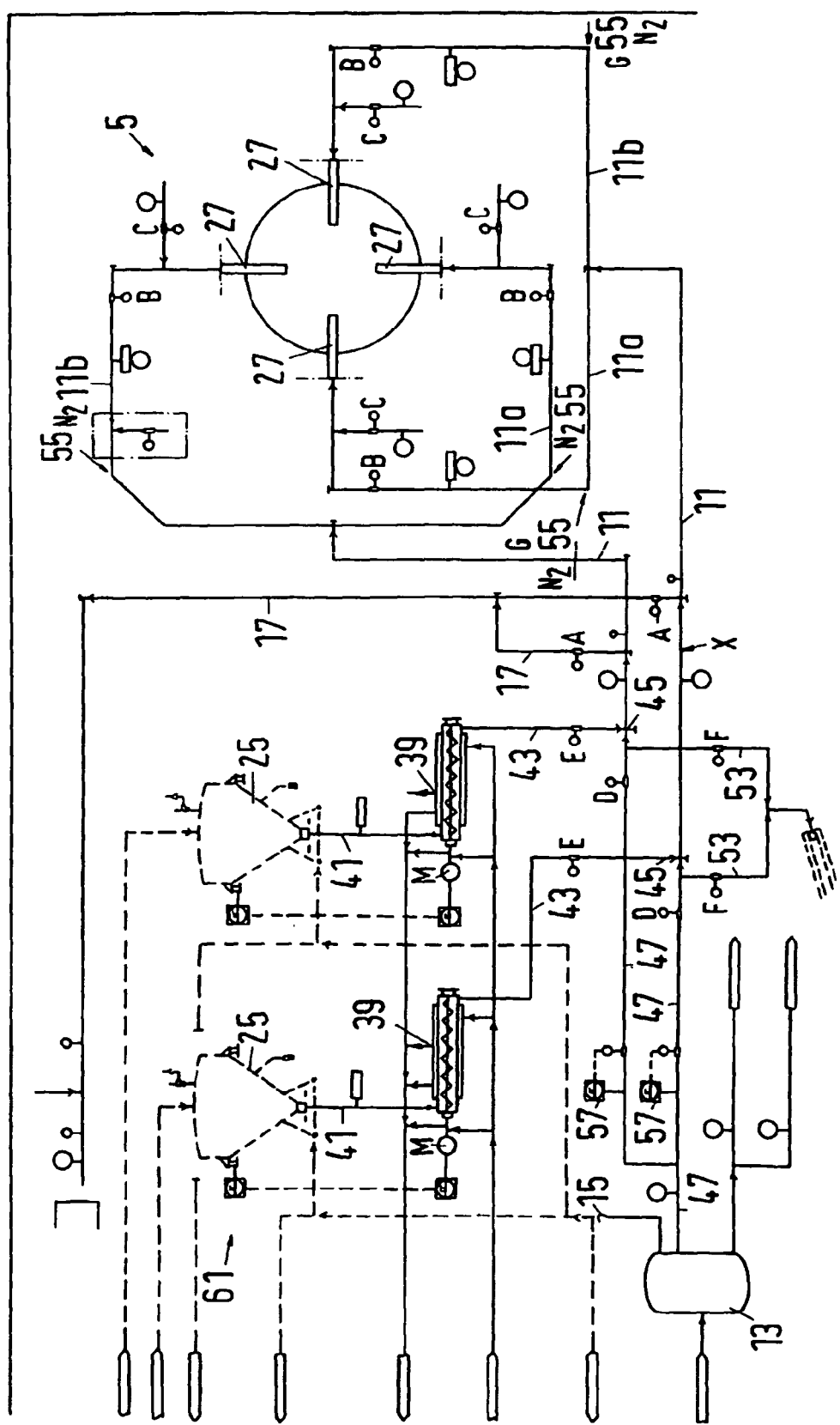
FIG. 4 illustrates in diagrammatic form the lower lock hoppers, screw conveyors, transfer lines, and return lines that form part of the hot iron-containing feed material transfer apparatus shown in FIG. 2.

FIGS. 2 to 4 illustrate one particular embodiment of a plant layout shown in FIG. 1.

The storage means 61 includes a series of storage vessels 21, 23, 25 capable of storing preheated iron ore fines under pressure and screw conveyors 39 for controlling the flow of preheated iron ore fines from the storage means 61 into the transfer lines 11.

FIG. 2 illustrates the relative locations of the preheater 3, the direct smelting vessel 5, and the storage means 61 as the apices of a triangle.

The preheater 3 includes a pan conveyor 71 (FIG. 3) that transfers preheated iron ore from the preheater, which is preferably a circulating fluidised bed, to the storage vessels 9.

FIG. 2 also illustrates the arrangement of the transfer lines 11 for transferring preheated iron ore fines from the storage means 61 to the solids injection lances of the direct smelting vessel 5 and the arrangement of the return lines 17 for returning preheated iron ore fines to the preheater 3.

The storage means 61 of the hot iron-containing feed material transfer apparatus 7 is divided into 2 groups 9a and 9b, with one group being connected via a transfer line 11 to one pair of solids injection lances 27 and the other group being connected via another transfer line 11 to the other pair of solids injection lances 27.

As can best be seen in FIG. 3, each group 9a, 9b of the storage means 61 includes 3 vertically aligned vessels 21, 23, 25. The vessels 23 are hoppers that are arranged to receive preheated iron ore fines discharged from the pan conveyor of the preheater and supplied via a flow splitter 29 to the inlets in the upper ends of the hoppers. The vessels 23 and 25 are upper and lower lock hoppers, respectively, that are arranged to store preheated iron ore fines under pressure.

The outlets of the hoppers 21 are connected to the respective inlets in the upper ends of the upper lock hoppers 23 via transfer lines 31a. The outlets of the upper lock hoppers 23 are connected to the respective inlets in the upper ends of the lower lock hoppers 25 via transfer lines 31b. Flow of preheated iron ore fines through the transfer lines 31a, 31b is controlled by valves 33a, 33b in the lines.

A pressure balancing line (not shown) also interconnects the upper and lower lock hoppers 23, 25 in each group. Gas flow through the pressure balancing lines is controlled by flow control valves (not shown).

Each group 9a, 9b of the storage means 61 also includes one of the screw conveyors 39, with the outlet of the lower lock hopper 25 being connected to a preheated iron ore fines inlet in the screw conveyor 39 via a transfer line 41.

In use, a fill sequence for one of the groups 9a, 9b of storage vessels 9 includes the following steps:
  with the lower lock hopper 25 closed, open valve 33a and allow preheated iron ore fines to flow downwardly by gravity feed from hopper 21 and into the upper lock hopper 23 and fill the upper lock hopper 23;
  when the preheated iron ore fines reach a predetermined level in the upper lock hopper 23, close the valve 33a and pressurise the upper lock hopper 23 to the same pressure as the pressure in the lower lock hopper 25, typically 4 bar absolute, by $N_2$ gas supplied from the $N_2$ gas source 13 via line 15;
  when the required pressure is reached, open valve 33b and the valve in the balancing line (not shown) between the upper and lower lock hoppers 23, 25 and allow preheated iron ore fines to flow downwardly by gravity feed from the upper lock hopper 23 into the lower lock hopper 25; and
  when the preheated iron ore fines reach a predetermined level in the lower lock hopper 23, close the valve 33b.

The pressure in the upper and lower lock hoppers 23, 25 is maintained at a target pressure, typically 4 bar absolute, by $N_2$ gas supplied from the $N_2$ gas source 13 via line 15 (FIGS. 1 and 4).

During the above-described filling sequence, the line 41 between the lower lock hopper 25 and the screw conveyor 39 remains open and preheated iron ore fines flow continuously downwardly from the lower lock hopper 25 into the screw conveyor 39 and are transported along the screw conveyor 39 at a predetermined mass flow rate and are supplied via an outlet line 43 to the transfer line 11 that connects the screw conveyor 39 to the pair of solids injection lances 27 at the ends of that transfer line 11.

The arrangement of the transfer lines 11 and the return line 17 can best be seen in FIGS. 2 and 4.

With reference to these Figures, as is indicated above, the storage means 61 of the hot iron-containing feed material transfer apparatus 7 is divided into 2 groups 9a and 9b, with one group being connected via a transfer line 11 to one pair of solids injection lances 27 and the other group being connected via another transfer line 11 to the other pair of solids injection lances 27. In use, preheated iron ore fines are supplied via the screw conveyors 39 to the inlet ends 45 of the transfer lines 11. $N_2$ gas under pressure and at ambient temperature is also supplied to the inlet ends 45 of the transfer lines 11 from the $N_2$ gas source 13 via lines 47 and picks up and transports the preheated iron ore fines along the transfer lines 11 to the solids injection lances 27.

Each transfer line 11 branches into two sub-branches 11a, 11b in the region of the direct smelting vessel 5 and the branch lines supply preheated iron ore fines to a diametrically opposed pair of solids injection lances 27.

The return line 17 for each transfer line 11 extends from the transfer line 11 to the preheater 3. The return lines 17 include appropriately located isolation valves A for controlling flow of preheated iron ore fines into the return lines 17.

The hot iron-containing feed material transfer apparatus 7 also includes a means for controlling the flow of preheated iron ore fines along the transfer lines 11 from the storage means 61 to the solids injection lances 27.

The flow control means includes flow control valves 57 in the gas lines 47 that interconnect the $N_2$ gas source 13 and the inlet ends 45 of the transfer lines 11 and a series of flow detectors (not shown) along the lines 11 and on the solids injection lances 27.

One of the drivers for selecting the flow rate of $N_2$ gas into the transfer lines 11 is to maintain a sufficient velocity in the lines to suspend the preheated iron ore fines in the gas and carry the fines along with the gas. It is preferable to minimise the flow velocity to the extent possible, while ensuring that the velocity is sufficient to carry the fines, because wear of the transfer lines increases as the velocity increases.

Another of the drivers for selecting the flow rate of $N_2$ gas into the transfer lines 11 is to deliver the preheated iron ore fines at a sufficient velocity so that the tip velocity of the gas conveying the injected solids from the solids injection lances 27 into the direct smelting vessel 5 is of the range 70-120 m/s.

In any given situation, the actual flow rates of $N_2$ gas and preheated iron ore fines supplied to the transfer lines 11 will be a function of a range of variables including the particle size distribution of the iron ore fines, temperatures of the $N_2$ gas and the iron ore fines, and target tip velocities for the solids injection lances 27 of the $N_2$ gas. In one particular embodiment modeled by the applicants the target pickup velocity of the $N_2$ gas is 19 m/s and the target tip velocity is 112 m/s and each group 9a, 9b of storage means 61 supplies 123 tph preheated iron ore fines (at 680° C.) to the associated transfer line 11 and the $N_2$ gas 13 supplies 3,100 $Nm^3$/hr $N_2$ gas at 20° C. to the transfer line 11.

The hot iron-containing feed material transfer apparatus 7 also includes a means for unblocking the transfer lines 11.

The unblocking means includes a series of appropriately located $N_2$ gas injection connections 55 along the length of the transfer lines 11, a series of appropriately located isolation valves B, D, and G in the transfer lines 11, isolation valves E in the lines 43 between the screw conveyors 43 and the transfer lines 11, the return lines 17, discharge lines 53 at the inlet ends 45 of the transfer lines 11, isolation valves A in the return lines 17, isolation valves C in the $N_2$ gas injection connections 55 near the solids injection lances 27, and isolation valves F in the discharge lines 53.

The $N_2$ gas injection connections 55 and the isolation valves A, B, D, E, F, and G enable $N_2$ gas to be selectively supplied to different locations along the lengths of the transfer lines 11 to selectively pressurise and depressurise the lines upstream and/or downstream of locations of blockages in the transfer lines 11. The return lines 17 and the discharge lines 53 facilitate discharge of dislodged material from the transfer lines 11 as a consequence of an unblocking operation.

In a situation in which there is a blockage in location "X" in one of the transfer lines 11, the following sequence of operations is used to unblock the line by pressurising the line upstream of the blockage and thereafter depressurising the line downstream of the blockage:
  close valves E, F, B, A, and G;
  open valves C in the $N_2$ gas injection connections 55 near the solids injection lances 27 to provide an $N_2$ purge through the lances 27 to maintain a positive pressure in the lances 27;

open valve D at the inlet end of the transfer line 11 and thereby allow $N_2$ gas from the $N_2$ gas source 13 to build up pressure upstream of the blockage X;

open valve A in the return line 17 and thereby suddenly reduce the pressure in the transfer line 11 downstream of the blockage X, with a view to dislodging the blockage and transferring dislodged material along the return line 17; and thereafter reset the valves to normal operation settings to resume supply of preheated iron ore fines to the solids injection lances 27.

The above sequence of steps may be repeated.

In operation, valve C may be opened first before any of valves E, F, B, A and G are closed. This is to provide a continuous gas flow through the lance independent of the position of any of these valves. Valve H may be used as an alternative to valve A.

In a situation in which there is a blockage in location "X" in one of the transfer lines 11, the following sequence of operations is used to unblock the line by pressurising the line downstream of the blockage and thereafter depressurising the line upstream of the blockage:

close valves B, A, F, D and E;

open valves C in the $N_2$ gas injection connections 55 near the solids injection lances 27 to provide an $N_2$ purge through the lances 27 to maintain a positive pressure in the lances 27;

open valves G in the branch lines 11a, 11b and thereby allow $N_2$ gas to build up pressure downstream of the blockage X;

open valve F in the discharge line 53 and thereby suddenly reduce the pressure in the transfer line upstream of the blockage X, with a view to dislodging the blockage and transferring dislodged material along the discharge line 53; and thereafter reset valves to normal operation settings to resume supply of preheated iron ore fines to the solids injection lances 27.

The above sequence of steps may be repeated.

In both of the above sequences of operations the key feature is to pressurise and depressurise the sections of the transfer line 11 upstream and downstream of the blockage.

The above-described plant is capable of supplying hot iron-containing feed material to the direct smelting vessel for different operating conditions, including unexpected perturbations, at different stages of a smelting campaign. It is capable of handling situations in which it is necessary to stop supplying hot iron-containing feed material altogether to the direct smelting vessel. In addition, the apparatus is capable of operating reliably in long-term smelting campaigns, and a key aspect of this requirement is that it is capable of unblocking hot iron-containing feed material transfer lines without manual intervention on the lines or plant shutdown.

Many modifications may be made to the embodiment of the present invention described above without departing from the spirit and scope of the invention.

The invention claimed is:

1. A direct smelting plant for producing molten metal from metalliferous feed material, comprising:

(a) a pretreatment unit for pretreating metalliferous feed material and producing pretreated feed material having a temperature of at least 200° C.;

(b) a direct smelting vessel for smelting pretreated metalliferous feed material to molten metal, the vessel being adapted to contain a molten bath of metal and slag, the vessel including a solids delivery means for receiving and thereafter supplying pretreated metalliferous feed material at a pressure above atmospheric pressure and at a temperature of at least 200° C. into the vessel;

(c) a hot feed material transfer apparatus for transferring pretreated metalliferous feed material from the pretreatment unit to the solids delivery means of the direct smelting vessel, the transfer apparatus comprising:

(i) a hot feed material storage means for storing pretreated metalliferous feed material at at least 200° C. and at a pressure above atmospheric pressure;

(ii) a hot feed material transfer line for transferring pretreated metalliferous feed material at least 200° C. under pressure to the solids delivery means of the direct smelting vessel;

(iii) means for unblocking the hot feed material transfer line without the need for manual intervention on the line or shutting down operation of the direct smelting vessel, which means for unblocking the hot feed material transfer line includes a plurality of pressure devices for selectively pressurising the hot feed material transfer line at a series of locations along the length of the line so that the line can be selectively pressurised and depressurised upstream and/or downstream of a blockage in the line and further includes a plurality of discharge lines for discharging dislodged material from a blockage in the hot feed material transfer line at a series of locations along the length of the line; and (iv) a pressurising means for supplying gas at a pressure above atmospheric pressure to the hot feed material storage means for pressurising the storage means and to the hot feed material transfer line for pressurising the transfer line and acting as a carrier gas for transporting pretreated metalliferous feed material along the transfer line to the solids delivery means, wherein the hot feed material transfer apparatus includes a means for returning pretreated metalliferous feed material to the pretreatment unit, which is adapted to operate while the direct smelting vessel is operating on stand-by and does not require pretreated metalliferous feed material.

2. The direct smelting plant according to claim 1, wherein the pretreatment unit is selected from a group consisting of: a preheater, a prereducer and a roaster.

3. The direct smelting plant according to claim 1, wherein the plant further comprises a hot feed material transfer means for transferring pretreated metalliferous feed material from the pretreatment unit to the hot feed material transfer apparatus.

4. The direct smelting plant according to claim 1, wherein the solids delivery means is a solids injection means for injecting pretreated metalliferous feed material under pressure into the direct smelting vessel.

5. The direct smelting plant according to claim 1, wherein the hot feed material transfer apparatus includes a means for controlling the flow of pretreated metalliferous feed material from the hot feed material storage means into the hot feed material transfer line.

6. The direct smelting plant according to claim 5, wherein the means for controlling the flow of pretreated metalliferous feed material is a screw conveyor having a pretreated metalliferous feed material inlet, a gas inlet, and an outlet for pretreated metalliferous feed material connected to the hot feed material transfer line.

7. The direct smelting plant according to claim 1, wherein the hot feed material storage means includes (a) an upper lock hopper having a pretreated metalliferous feed material inlet, a gas inlet for pressurising the lock hopper, and a pretreated metalliferous feed material outlet, (b) a lower lock hopper having a pretreated metalliferous feed material inlet, a gas inlet for pressurising the lock hopper, and a pretreated metalliferous feed material outlet, and (c) a line interconnecting the outlet of the upper lock hopper and the inlet of the lower lock hopper.

8. The direct smelting plant according to claim 7, wherein the hot feed material transfer apparatus also includes a means for controlling the flow of pretreated metalliferous feed material along the hot feed material transfer line from the hot feed material storage means to the solids delivery means.

9. The direct smelting plant according to claim 1, wherein the means for returning pretreated metalliferous feed material to the pretreatment unit includes (a) a return transfer line interconnecting the hot feed material transfer line and the pretreatment unit and (b) valves in the lines that are selectively operable to allow pretreated metalliferous feed material flowing along the hot feed material transfer line to be returned to the pretreatment unit via the return transfer line.

10. The direct smelting plant according to according to claim 1, wherein the return transfer line is the discharge line.

11. The direct smelting plant according to claim 1, wherein the means for unblocking the hot feed material transfer line includes a plurality of detectors for detecting the location of a blockage in the hot feed material transfer line.

12. The direct smelting plant according to claim 1, wherein the direct smelting vessel is a fixed smelting vessel for holding a molten bath of metal and slag and a gas space above the bath and the solids delivery means include 2 or more pairs of solids injection lances arranged around and extending into the vessel, with the lances of each pair of lances being diametrically opposed to each other, with at least one pair of lances being provided for injecting pretreated metalliferous feed material and at least one of the other pairs of lances being provided for injecting solid carbonaceous material, and with the pairs of lances being arranged around the vessel so that adjacent lances are lances that are provided to inject different materials.

* * * * *